(12) United States Patent
Ishigaki et al.

(10) Patent No.: US 8,102,380 B2
(45) Date of Patent: Jan. 24, 2012

(54) INFORMATION PROCESSING DEVICE, PROGRAM AND METHOD TO DETECT HAND ROTATION GESTURES

(75) Inventors: Satoru Ishigaki, Ome (JP); Toshifumi Ootake, Ome (JP); Kei Sakamoto, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 768 days.

(21) Appl. No.: 12/191,614

(22) Filed: Aug. 14, 2008

(65) Prior Publication Data

US 2009/0058800 A1 Mar. 5, 2009

(30) Foreign Application Priority Data

Aug. 30, 2007 (JP) ................. 2007-224891

(51) Int. Cl.
*G06F 3/041* (2006.01)
(52) U.S. Cl. .......... 345/173; 715/784; 382/296
(58) Field of Classification Search .......... 345/156–184; 463/1–47; 715/784–787, 865–866; 382/190–231, 382/288–289, 293–297
See application file for complete search history.

(56) References Cited

U.S. PATENT DOCUMENTS

| | | | | |
|---|---|---|---|---|
| 5,645,077 A | * | 7/1997 | Foxlin | 600/587 |
| 6,144,366 A | * | 11/2000 | Numazaki et al. | 345/156 |
| 6,323,846 B1 | * | 11/2001 | Westerman et al. | 345/173 |
| 7,720,552 B1 | * | 5/2010 | Lloyd | 700/10 |
| 2003/0095140 A1 | * | 5/2003 | Keaton et al. | 345/700 |
| 2004/0189720 A1 | * | 9/2004 | Wilson et al. | 345/863 |
| 2004/0252109 A1 | * | 12/2004 | Trent et al. | 345/174 |
| 2007/0002015 A1 | * | 1/2007 | Mohri et al. | 345/157 |
| 2007/0124702 A1 | * | 5/2007 | Morisaki | 715/863 |
| 2007/0236475 A1 | * | 10/2007 | Wherry | 345/173 |
| 2008/0089588 A1 | * | 4/2008 | Nagahashi | 382/190 |

FOREIGN PATENT DOCUMENTS

| | | |
|---|---|---|
| JP | 04-048318 | 2/1992 |
| JP | 11-149563 | 6/1999 |
| JP | 2004-029918 | 1/2004 |
| JP | 2005-518612 | 6/2005 |
| JP | 2006-209563 | 8/2006 |
| JP | 2007-172577 | 7/2007 |

OTHER PUBLICATIONS

Japanese Office Action Nov. 1, 2011.

* cited by examiner

*Primary Examiner* — Amr Awad
*Assistant Examiner* — Liliana Cerullo
(74) *Attorney, Agent, or Firm* — Pillsbury Winthrop Shaw Pittman, LLP

(57) ABSTRACT

According to one embodiment, an information processing device includes a position detecting section configured to detect a position of a hand from an input image of the hand, a memory section configured to store data of the position of the hand detected by the position detecting section, a rotation judging section configured to judge, assuming that records of the data of the position of the hand stored in the memory section show a rotary movement, that a latest position of the hand falls in an angle range predicted for the rotary movement, and an executing section configured to, when the rotation judging section judges that the latest position of the hand falls in the angle range, obtain a rotational angle at the latest position of the hand and also execute a process that corresponds to a predetermined rotary movement of the hand.

8 Claims, 5 Drawing Sheets

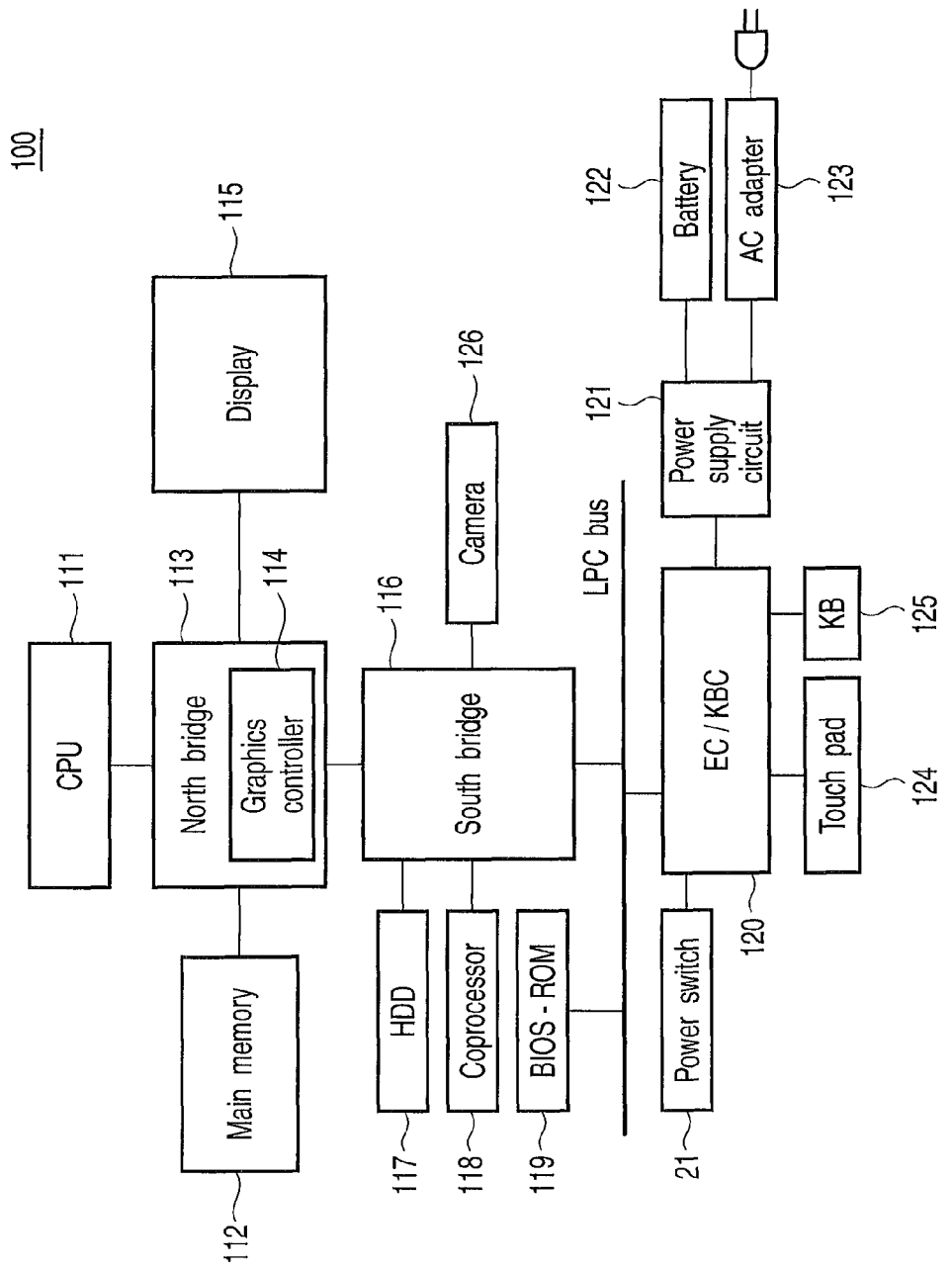
F I G. 1

INFORMATION PROCESSING DEVICE, PROGRAM AND METHOD TO DETECT HAND ROTATION GESTURES

CROSS-REFERENCE TO RELATED APPLICATIONS

This application is based upon and claims the benefit of priority from Japanese Patent Application No. 2007-224891, filed Aug. 30, 2007, the entire contents of which are incorporated herein by reference.

BACKGROUND

1. Field

One embodiment of the present invention relates to an information processing device, program, and method. It particularly relates to an information processing device that recognizes gestures of the user and performs control based on a recognized gesture, as well as a program and a method for such a device.

2. Description of the Related Art

Methods for operating an information processing device such as a television and a personal computer in accordance with a user's instruction by a gesture have been suggested. With such methods, the information processing device can be remotely controlled without any input device such as a mouse, keyboard, or remote controller.

Methods of capturing a gesture or any other movement include an algorithm technology of analyzing an image photographed by a camera and detecting and recognizing a circular orbit movement of the operator's hand (see Jpn. Pat. Appln. KOKAI Publication No. 2007-172577).

With the method set forth in Jpn. Pat. Appln. KOKAI Publication No. 2007-172577, however, in which the roundness of the circular movement is calculated from several coordinate points, the circular movement may not be properly detected depending on the speed of the movement. Furthermore, it is difficult to switch in a seamless manner between a normal mode and an operating mode without checking whether or not the system is in operation, based only on the determination as to whether or not the hand movement is circular.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram for schematically showing an example structure of the information processing device according to an embodiment of the present invention.

DETAILED DESCRIPTION

Figure 2:
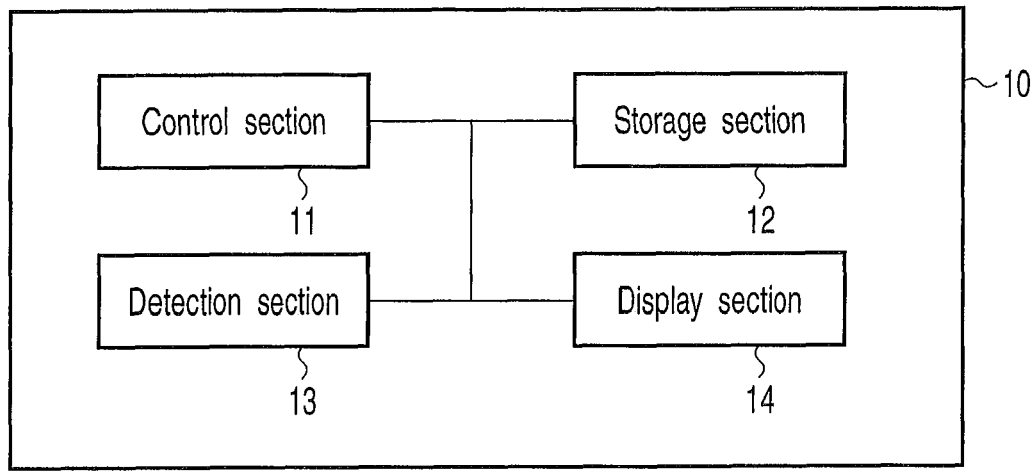
FIG. 2 is an exemplary block diagram for showing a functional structure of the information processing device according to the embodiment.

Various embodiments according to the invention will be described hereinafter with reference to the accompanying drawings. In general, according to one embodiment of the invention, an information processing device includes a position detecting section configured to detect a position of a hand from an input image of the hand; a memory section configured to store data of the position of the hand detected by the position detecting section; a rotation judging section configured to judge, assuming that records of the data of the position of the hand stored in the memory section show a rotary movement, that a latest position of the hand falls in an angle range predicted for the rotary movement; and an executing section configured to, when the rotation judging section judges that the latest position of the hand falls in the angle range, obtain a rotational angle at the latest position of the hand and also execute a process that corresponds to a predetermined rotary movement of the hand.

Exemplary embodiments of the present invention will be explained below with reference to the drawings.

First, an information processing device according to the first embodiment of the present invention will be discussed with reference to FIG. 1.

FIG. 1 is a block diagram schematically showing an example structure of the information processing device according to the first embodiment of the present invention. This information processing device is realized as a notebook-size personal computer, for example.

As illustrated in FIG. 1, a personal computer 100 comprises a CPU 111, a main memory 112, a north bridge 113, a graphics controller (image display section) 114, a display 115, a south bridge 116, a hard disk drive (HDD) 117, a coprocessor 118, a BIOS-ROM 119, an embedded controller/keyboard controller (EC/KBC) IC 120, a power supply circuit 121, a battery 122, an AC adapter 123, a touchpad 124, a keyboard (KB) 125, a camera 126, a power switch 21 and the like.

The CPU 111 is a processor that controls the operation of the personal computer 100. The CPU 111 executes the operating system (OS) and various application programs loaded from the HDD 117 onto the main memory 112. The CPU 111 also executes the Basic Input/Output System (BIOS) that is stored in the BIOS-ROM 119. The BIOS is a program for controlling peripheral devices. The BIOS is implemented immediately after the power of the personal computer 100 is turned on.

The north bridge 113 is a bridge device that connects the local bus of the CPU 111 and the south bridge 116. The north bridge 113 conducts communications with the graphics controller 114 by way of the Accelerated Graphics Port (AGP) bus.

The graphics controller 114 is a display controller that controls the display 115 of the personal computer 100. The graphics controller 114 generates a display signal that is to be output to the display 115, from the display data written in the VRAM (not shown in the drawings) by the OS or an application program. The display 115 is, for example, a liquid crystal display (LCD).

The HDD 117, the coprocessor 118, the BIOS-ROM 119, the camera 126, and the EC/KBC 120 are connected to the south bridge 116. In addition, the south bridge 116 includes an Integrated Drive Electronics (IDE) controller to control the HDD 117 and the coprocessor 118.

The EC/KBC 120 is a one-chip microcomputer in which an embedded controller (EC) configured to manage power consumption and a keyboard controller (KBC) configured to control the touchpad 124 and the keyboard (KB) 125 are integrated. When the power switch 21 is operated, the EC/KBC 120 turns on the power of the personal computer 100, together with the power supply circuit 121. When power is externally supplied to the personal computer 100 by way of the AC adapter 123, the personal computer 100 is driven by an external power supply. When power is not externally supplied, the personal computer 100 operates on the battery 124.

The camera 126 may be a USB camera. The USB connector of the camera 126 is connected to a USB port (not shown in the drawings) provided on the main body of the personal computer 100. An image taken by the camera 126 (such as hand movement) can be displayed on the display 115 of the personal computer 100. The frame rate of the images supplied by the camera 126 may be 15 frames/second. The camera 126 may be externally provided or built in the personal computer 100.

The coprocessor 118 processes moving images taken from the camera 126.

FIG. 2 is a block diagram for showing part of the functional structure of the personal computer 100 in detail.

As indicated in FIG. 2, the personal computer 100 comprises a control section 11, a storage section 12, a detection section 13, and a display section 14. The control section 11 processes moving images taken from the camera 126. The storage section 12 stores various thresholds and the like that are employed for judgment of the moving images (whether they show a hand movement) and judgment of movements in the moving images (how the hand moves). The detection section 13 detects a movement in a moving image taken from the camera 126 (rotation start movement, rotary movement, rotation end movement and the like). The display section 14 displays an operation such as screen scrolling in accordance with the movement detected by the detection section 13.

Figure 3:
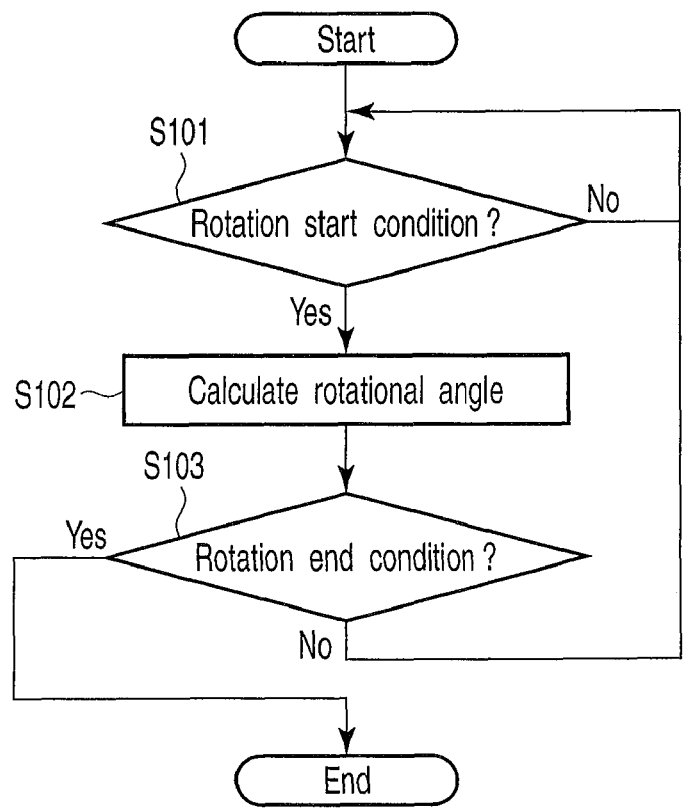
FIG. 3 is an exemplary flowchart for explaining the information processing method according to the embodiment.

FIG. 3 is a flowchart for explaining the overview of the information processing method to which the information processing device according to the first embodiment of the present invention is applied.

First, the control section 11 of the personal computer 100 obtains moving images from the camera 125 and processes these images. The detection section 13 determines whether the processed images are images of a hand movement. When it is determined as images of a hand movement, it is determined whether the hand movement is a rotary movement (Step S101). When the hand movement is determined as a rotary movement (YES in Step S101: rotation start detected), the control section 11 calculates the rotational angle (Step S102). In accordance with the calculated rotational angle, the display section 14 displays the process such as image scrolling. For example, when a right-handed (left-handed) rotation is detected, the screen is scrolled down (up).

When the rotation end movement is detected (YES in Step S103), the screen scrolling or the like is stopped.

Figure 4:
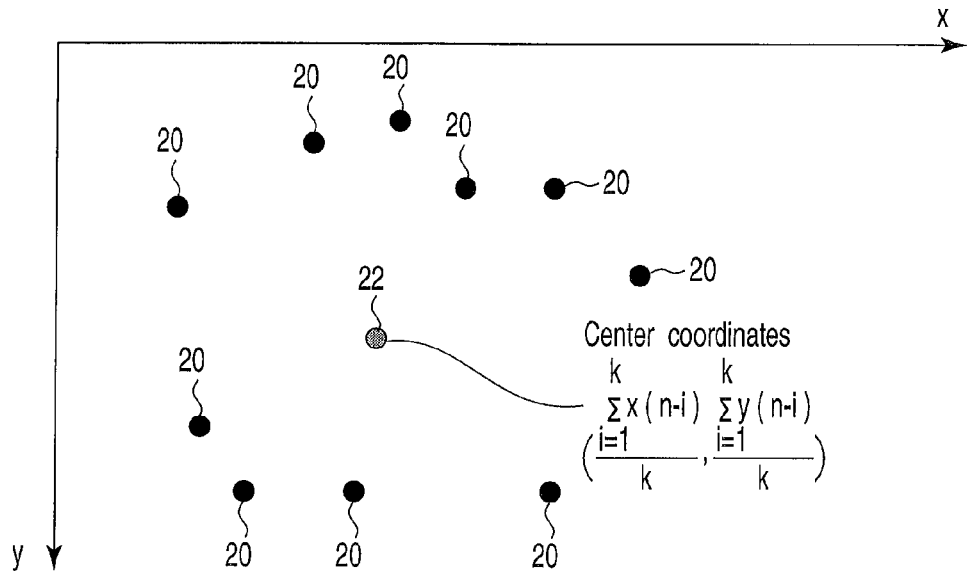
FIG. 4 is an exemplary schematic diagram for showing a method for calculating the coordinates of the center.

Next, the aforementioned detection of the rotation start movement, rotary movement, and rotation end movement will be explained in detail with reference to FIG. 4.

(1) Detection of Rotation Start Movement

An input moving image will be regarded as a moving image frame. The input moving image is put into the storage section 12, and moving image frames of the past can be used as a reference.

Figure 6:
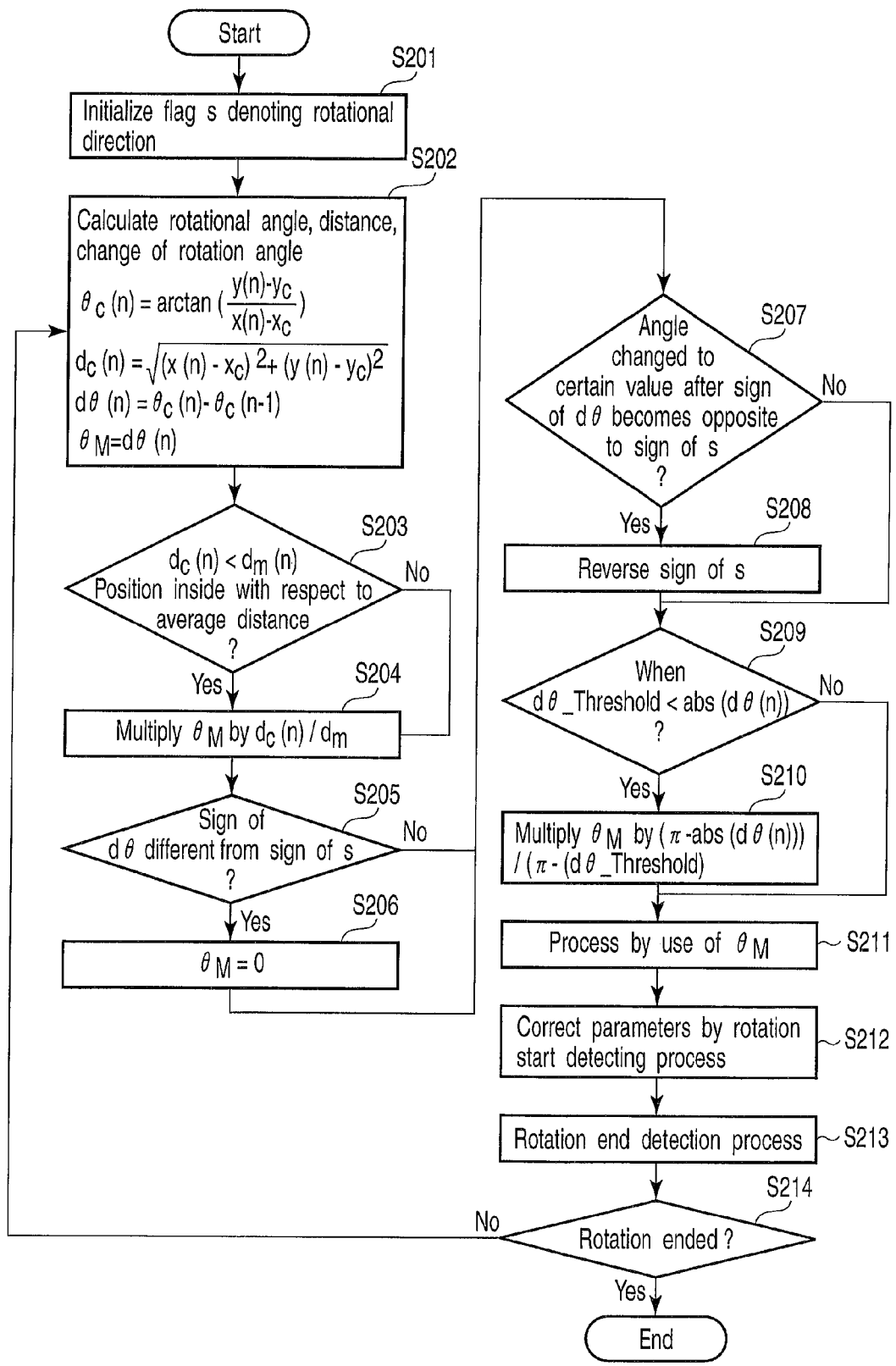
FIG. 6 is an exemplary flowchart for explaining the information processing method according to the embodiment in detail.

First, a flag s, which denotes the rotational direction, is initialized (Step S201 in FIG. 6).

Next, whether or not the hand in the outputs 20 of the past k frames before the $n^{th}$ frame (see FIG. 4) is rotated is determined in the following manner. Then, the coordinates 22 of the center of the hand position in the past k frames, $x_c(n,k)$, $y_c(n,k)$, are calculated in the following manner (see FIG. 4).

$$x_c(n, k) = \frac{\sum_{i=1}^{k} x(n-i)}{k}$$

$$y_c(n, k) = \frac{\sum_{i=1}^{k} y(n-i)}{k}$$

The angle $\theta_{nk}(i)$ and distance $d_{nk}(i)$ of the hand position of $i-k+1 (0 \leq i < k)$ frames before the $n^{th}$ frame to with respect to the center coordinates, and the image taking time $t_{nk}(n,k,i)$ with respect to the image taking time of the $n-(k-1)^{th}$ frame are calculated by the following expressions.

$$\theta_{nk}(i) = \arctan\left(\frac{y(n-i) - y_c(n, k)}{x(n-i) - x_c(n, k)}\right) \ (i = 0)$$

$$\theta_{nk}(i) = \arctan\left(\frac{y(n-i) - y_c(n, k)}{x(n-i) - x_c(n, k)}\right) + 2\pi a \ (1 \leq i)$$

An integer that satisfies the following condition is adopted for the value a (Step S202: FIG. 6).

$$\theta_{nk}(i-1) - \pi < \theta_{nk}(i) \leq \theta_{nk}(i-1) + \pi$$

$$d_{nk}(i) = \sqrt{(x(n-i) - x_c(n, k))^2 + (y(n-i) - y_c(n, k))^2}$$

$$t_{nk}(i) = t(n-i-k+1) - t(n-k+1)$$

A linear regression analysis is performed on $\theta_{nk}(i)$ and $t_{nk}(n,k,i)$, and on $d_{nk}(i)$ and $t_{nk}(n,k,i)$ by the method of least squares. Correlation coefficients $A_{\theta nk}$, $B_{\theta nk}$, $A_{dnk}$ and $B_{dnk}$ are thereby obtained to find the predicted value $\Theta_{nk}(i)$ of $\theta_{nk}(i)$, and also coefficients of determination which indicate the degree of the correlation are obtained.

It is assumed that $CD_{\theta nk}$ is the coefficient of determination for the correlation between $\theta_{nk}(i)$ and $t_{nk}(n,k,i)$ and that $CD_{dnk}$ is the coefficient of determination for the correlation between $d_{nk}(i)$ and $t_{nk}(n,k,i)$.

Figure 5:
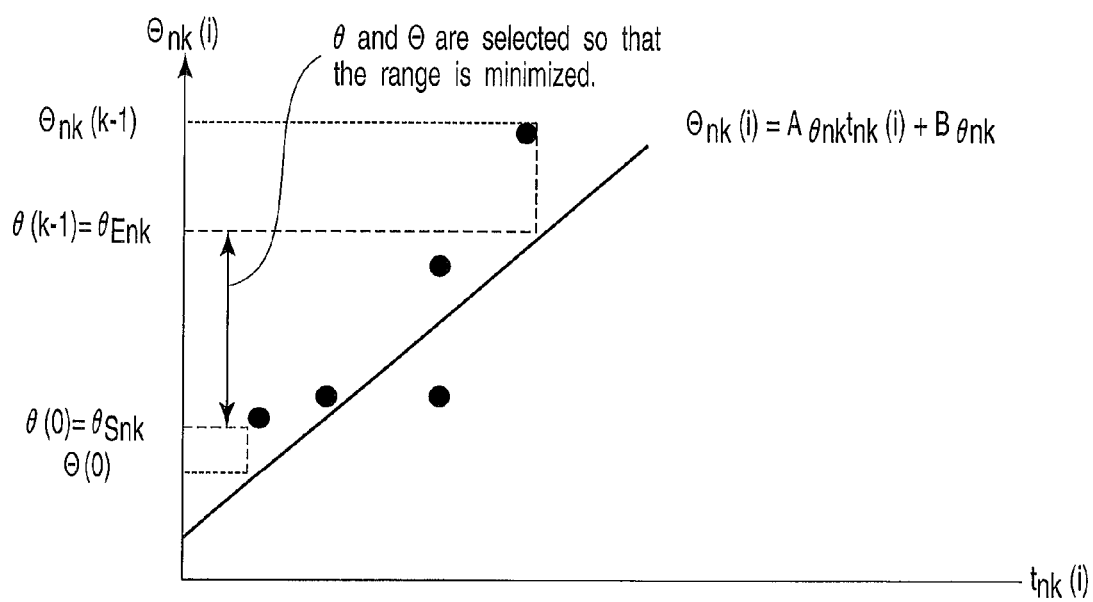
FIG. 5 is an exemplary schematic diagram for showing a method of calculating a rotational angle according to a linear regression analysis.

By use of the correlation coefficients $A_{\theta nk}$, $B_{\theta nk}$, $A_{dnk}$ and $B_{d\theta nk}$, $\Theta_{nk}(i)$ and $D_{nk}(i)$ can be expressed as follows (see FIG. 5).

$$\Theta_{nk}(i) = A_{\theta nk} t_{nk}(i) + B_{\theta nk}$$

$$D_{nk}(i) = A_{dnk} t_{nk}(i) + B_{d\theta nk}$$

The start angle $\theta_{Snk}(i)$ and the end angle $\theta_{Enk}(i)$ are obtained in such a manner that the angle range between the start to the end is minimized, by comparing the measured value $\theta_{nk}(i)$ and the predicted value $\Theta_{nk}(i)$. (This process is not essential, and the operation can do without it.)

When $0<A_{\Theta nk}$, $\theta_{Snk}=\max(\theta(0),\Theta(0))$ $\theta_{Enk}=\min(\theta(k-1),\Theta(k-1))$ Otherwise, $\theta_{Snk}=\min(\theta(0),\Theta(0))$ $\theta_{Enk}=\max(\theta(k-1),\Theta(k-1))$ When the following conditions are satisfied, a rotational movement is regarded as being performed around the center at $x_c(n,k)$, $y_c(n,k)$ in the past k frames before the $n^{th}$ frame, and a rotational operation is initiated.

$\theta_{Snk}=\min(\theta(0),\Theta(0))$ $\theta_{Enk}=\max(\theta(k-1),\Theta(k-1))$ Angle_Threshold$<abs(\theta_{Enk}-\theta_{Snk})$ CD_$\theta$_Threshold$<CD_{\theta nk}$ CD_d_Threshold$<CD_{dnk}$ Angle_Threshold is a threshold value of the rotational angle. A rotational operation is regarded as being performed when the angle of the rotation made in the past k frames is equal to or greater than this threshold value. The threshold value is set to approximately between $2\pi$ and $4\pi$.

CD_$\theta$_Threshold is a threshold value that is employed to confirm that the angle and the time form a linear regression line. Because the angle and the time need to establish a strong correlation, the threshold is set close to 1 (for example, 0.9).

CD_d_Threshold is a threshold value that is employed to confirm that the distance from the center and the time form a linear regression line. Because the distance does not have to have as strong a correction with the time as the angle does, CD_d_Threshold is set to a smaller value than CD_$\theta$_Threshold.

Every time a detection result of a certain frame is received, the aforementioned process is executed on different ranges of previous frames so that rotational operations at different speeds can be detected.

In addition, when a rotational operation is initiated, the center coordinates $x_c(n,k)$, $y_c(n,k)$ and the average distance from the center coordinates, $d_m(n,k)$, are stored in the storage section 12:

$$d_m(n,k) = \frac{\sum_{i=1}^{k} d_{nk}(i)}{k}$$

(2) Detection of Rotational Movement

After the rotational operation by hand is initiated by the detection of a rotational movement, the center of the rotation and the current hand position are displayed on the screen. A change in rotation amount is calculated in correspondence with the angle and distance between the center of the rotation and the current hand position, and an operation such as scrolling is thereby performed.

The center of the rotation during the rotational operation is recorded as $x_c$, $y_c$, and the average distance between the center of the rotation and the hand position is recorded as $d_m$. At the beginning of the rotation, $x_c$, $y_c$ is $x_c(n,k)$, $y_c(n,k)$, and $d_m$ is $d_m(n,k)$.

Further, a symbol s is recorded as the direction of the rotation. At the beginning of the rotation, s has the same sign as $A_{\Theta nk}$.

It is assumed that the angle and the distance between the center of the rotation and the hand position in the $n^{th}$ frame are $\theta_c(n)$ and $d_c(n)$, respectively.

$$\theta_c(n) = \arctan\left(\frac{y(n)-y_c}{x(n)-x_c}\right)$$

$$d_c(n) = \sqrt{(x(n)-x_c)^2 + (y(n)-y_c)^2}$$

First, the change in angle from the previous frame, $d\theta(n)$, is calculated as follows:

$d\theta(n)=\theta_c(n)-\theta_c(n-1)$

When the sign of $d\theta(n)$ is the same as that of s, the value $\theta_M$ that denotes the degree of the angle change from the previous frame is obtained in accordance with the following steps:

1) Let $\theta_M=d\theta(n)$.
2) When $d_c(n)<d_m$, $\theta_M$ is multiplied by $d_c(n)/d_m$.

Figure 7:
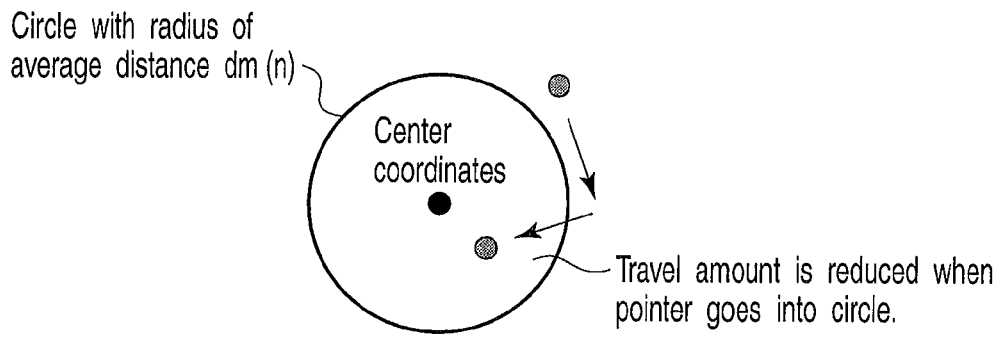
FIG. 7 is an exemplary schematic diagram of the user making a small circle with his/her hand.

If the hand passes near the center of the rotation, the angle change increases even with a small hand movement. In order to prevent the operation from being made erroneously to a large degree, the operation amount is reduced (optional procedure: YES in Step S203, Step S204: see FIGS. 6 and 7).

When the sign of $d\theta(n)$ differs from that of s (YES in Step S205 in FIG. 6), $\theta_M$ is set to 0 (Step S206 in FIG. 6). When the operation is made in a direction different from s at an angle equal to or greater by a predetermined angle ($\pi/2$, for example) than $\theta_c$ of the latest rotation in the same direction as s (YES in Step S207 in FIG. 6), the sign of s is negated (Step S208 in FIG. 6).

3) When $d\theta$_Threshold$<abs(d\theta(n))$ (YES in Step S209 in FIG. 6), $\theta_M$ is multiplied by $(\pi-abs(d\theta(n)))/(\pi-d\theta$_Threshold) (Step S210 in FIG. 6).

When $d\theta$ is close to $\pi$, it is difficult to determine in which direction the rotation is made. Thus, the operation amount is reduced (optional procedure).

The value $\theta_M$ obtained as described above is adopted as an operation amount (Step S211 in FIG. 6), and an operation such as screen scrolling is thereby performed.

For example, when $\theta_M$ is equal to or smaller than $-\pi$, scrolling is performed one screen upward. When $\theta_M$ is equal to or greater than $\pi$, scrolling is performed one screen downward.

After the initiation of the rotational operation, the rotation start detecting process is still carried out in the same manner as at the beginning of the rotation (1). When a rotation is detected, $x_c$, $y_c$ and $d_m$ are updated so as to bring close to the center and average distance of the newly detected rotation (Step S212 in FIG. 6).

(3) Detection of Rotation End Movement

Figure 8:
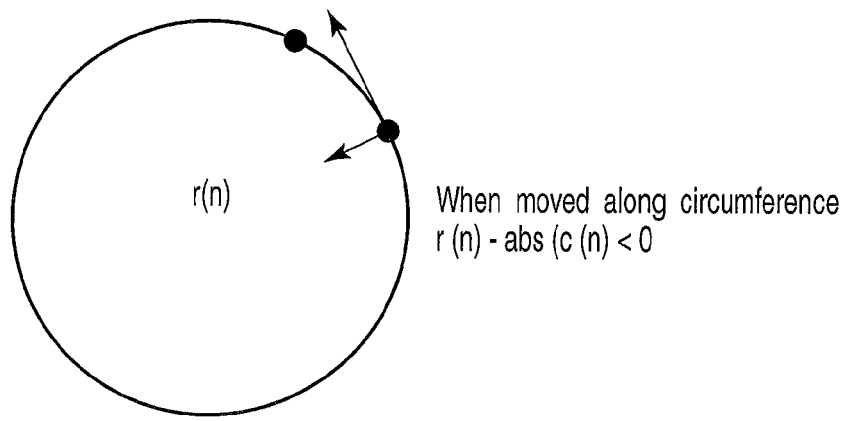
FIG. 8 is an exemplary schematic diagram of the user making a normal circle with his/her hand.

During a normal rotational operation (see FIG. 8), the amount of rotational operation is calculated with the aforementioned process. Furthermore, the end of the rotation is judged with the following process (Step S214 in FIG. 6).

The difference $dx(n)$, $dy(n)$ in the hand position between the current frame and the previous frame is calculated as follows:

$dx(n)=x(n)-x(n-1)$ $dy(n)=y(n)-y(n-1)$

The travel amount in the rotational operation in the circumferential direction is denoted as c(n), and the travel amount in the direction orthogonal to the circumference is denoted as r(n), $$c(n) = \sqrt{dx(n)^2 + dy(n)^2} \sin(\theta(n))$$

$$r(n) = \sqrt{dx(n)^2 + dy(n)^2} \cos(\theta(n))$$

The travel amount o(n) in the outer circumferenceouter circumference direction is calculated as follows:

$$o(n) = r(n) - abs(c(n))$$

The cumulative amount of o(n) is denoted as $o_h(n)$.

$$o_h(n) = o_h(n-1) + o(n)$$

$$o_h(n) = 0 \text{ (if } o_h(n-1) + o(n) < 0)$$

Figure 9:
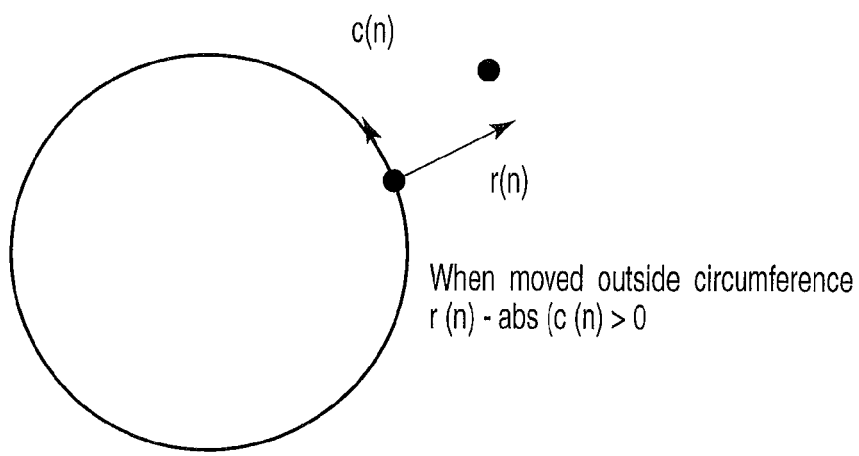
FIG. 9 is an exemplary schematic diagram of the user moving his/her hand to the outside of a circle.

When either of the following conditions is satisfied, the rotation operation is terminated (Step S213; see FIGS. 6 and 9).

The first condition indicates that the travel amount in the outer circumference direction is too large. The second condition indicates that the rotary movement is too far away from the center.

$$d_m \times \text{Outward\_Movement\_Rate} < o_h(n)$$

$$d_m \times \text{Outward\_Distance\_Rate} < d_c(n)$$

The start of the rotation is judged only from a hand movement. In the normal mode, a cursor operation or other operations are conducted, but only when a hand rotational movement occurs, a rotational operation is conducted.

The center and the current hand position are displayed on the screen during the rotation, and an operation is performed in accordance with an angle between the center and the current hand position. This makes it easy for the user to adjust the rotation amount and reverse the direction of the rotation.

Because the end of the rotation is judged from the hand movement only, a normal cursor operation can be performed when the hand rotation is stopped in the middle of the rotational operation.

The purpose of the present invention is to offer an information processing device that can accurately detect circular movements and switch the operations in a seamless manner, as well as a program and method for such a device.

According to the present embodiment, a circular motion can be accurately detected with a simple structure, and the cursor can be moved in accordance with the detected circular motion. Furthermore, the circular motion can be easily terminated.

It should be noted that the present invention is not limited to the embodiment as discussed above. The present invention, when put into practice, may be realized by modifying the structural components without departing from the scope of the invention.

Furthermore, various inventions may be formed by suitably combining the structural components discussed above. For instance, some of the structural components of the embodiment may be omitted, or the structural components of different embodiments may be suitably combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing device comprising:
a position detecting section configured to detect a position of a hand from an input image of the hand;
a memory section configured to store data of the position of the hand detected by the position detecting section;
a rotation judging section configured to judge, assuming that records of the data of the position of the hand stored in the memory section show a rotary movement, that a latest position of the hand falls in an angle range predicted for the rotary movement;
an executing section configured to, when the rotation judging section judges that the latest position of the hand falls in the angle range, obtain a rotational angle at the latest position of the hand and also execute a process that corresponds to a predetermined rotary movement of the hand; and
a distance determining section that determines a first distance that indicates a distance between the latest position of the hand and a center of the rotary movement assumed by the rotation judging section,
wherein, when it is judged that the first distance is smaller than a second distance indicating a radius of the rotary movement assumed by the rotation judging section, the executing section executes the process with the rotational angle reduced proportionately with the first distance.

2. The information processing device according to claim 1, wherein the executing section executes a process that corresponds to a rotary movement in a predetermined reverse direction when the rotation judging section judges that the latest position of the hand is within an angle range in which the hand is rotating in a reverse direction from an assumed direction of the rotary movement.

3. The information processing device according to claim 1, wherein, when it is judged that the first distance is greater, by a predetermined value or any larger value, than the second distance, the process is terminated.

4. The information processing device according to claim 3, wherein, when it is judged that the first distance is smaller than the second distance, the distance determining section determines that the first distance is substantially equal to the second distance.

5. A digital information non-transitory storage medium that stores a program configured to cause a computer to execute steps of:
detecting a position of a hand from an input image of the hand;
storing data of the position of the hand detected at the step of detecting the position;
judging, when it is assumed that records of the data of the position of the hand stored at the storing step show a rotary movement, that a latest position of the hand falls in an angle range predicted for the rotary movement;
obtaining, when it is judged at the judging step that the latest position of the hand falls in the angle range, a rotational angle at the latest position of the hand, and also executing a process that corresponds to a predetermined rotary movement of the hand; and
a distance determining step of determining a first distance that indicates a distance between the latest position of the hand and a center of the rotary movement assumed at the judging step, wherein, when it is judged that the first distance is smaller than a second distance indicating a radius of the rotary movement assumed by the judging step, the process is executed at the executing step with the rotational angle reduced proportionately with the first distance.

6. The digital information non-transitory storage medium according to claim 5, wherein at the executing step, a process that corresponds to a rotary movement in a predetermined reverse direction is executed when it is judged that the latest position of the hand is within an angle range in which the hand is rotating in a reverse direction from an assumed direction of the rotary movement.

7. The digital information non-transitory storage medium according to claim 5,
wherein, when it is judged that the first distance is greater, by a predetermined value or any larger value, than the second distance, the process is terminated.

8. The digital information non-transitory storage medium according to claim 7, wherein, when it is judged at the distance determining step that the first distance is smaller than the second distance, it is determined that the first distance is substantially equal to the second distance.

\* \* \* \* \*